| United States Patent [19] | [11] | 4,103,077 |
| O'Mahoney, Jr. | [45] | Jul. 25, 1978 |

[54] GREEN STRENGTH OF SYNTHETIC ELASTOMERS

[75] Inventor: Joseph F. O'Mahoney, Jr., Stow, Ohio

[73] Assignee: The Goodyear Tire & Rubber Company, Akron, Ohio

[21] Appl. No.: 685,832

[22] Filed: May 13, 1976

[51] Int. Cl.² ............................. C08F 8/30; C08F 8/32
[52] U.S. Cl. ........................................ 526/51; 526/20; 526/21; 526/147; 526/219
[58] Field of Search ......................................... 526/51

[56] References Cited

FOREIGN PATENT DOCUMENTS

| 2,447,929 | 4/1975 | Fed. Rep. of Germany | 526/51 |
| 1,037,131 | 1/1964 | United Kingdom | 526/51 |

Primary Examiner—William F. Hamrock
Attorney, Agent, or Firm—Oldham & Oldham

[57] ABSTRACT

The green strength of synthetic elastomers is improved by mixing a synthetic elastomer such as synthetic cis-1,4-polyisoprene or polybutadiene with from about 0.25 to about 2.0 parts by weight of a dihydrazide compound per 100 parts of the elastomer. Upon mixing at temperatures ranging from about 125° F to about 300° F, the dihydrazide will crosslink the synthetic elastomers and impart thereto improved green strength. This synthetic elastomer may then be blended with either natural or synthetic cis-1,4-polyisoprene in accordance with common practice in the rubber industry when the end product is a tire.

13 Claims, No Drawings

GREEN STRENGTH OF SYNTHETIC ELASTOMERS

BACKGROUND OF THE DISCLOSURE

The present invention relates to improved green strength of synthetic elastomers. More specifically, the present invention relates to improving green strength of synthetic elastomers through the use of dihydrazide compounds which cross-link the elastomers.

Science and technology in the elastomer field has improved to such an extent that synthetic elastomers have supplemented or replaced natural rubber to a great extent in the fabrication of tires and other rubber products. Stereo-specific polymers and particularly synthetic cis-1,4-polyisoprene have demonstrated physical properties similar to and thus are capable of becoming a complete replacement of natural rubber. However, a major deficiency of rubber elastomers including synthetic cis-1,4-polyisoprene is its lack of sufficient green strength and tack required for satisfactory processing or building properties required as in building tires. The abatement of this deficiency has long been sought by the art and would greatly facilitate in the replacement of natural rubber which is solely produced in tropical climates.

The term "green strength", while being commonly employed and generally understood by persons skilled in the rubber industry, is nevertheless a difficult property to precisely define. Basically, green strength may be defined as the tensile strength developed when an unvulcanized polymer composition of proper configuration is stressed under controlled conditions. Beyond an initial yield point, natural rubber compositions will show increasing strength against rupture while synthetic polyisoprene will fall below the yield point or will increase only slightly above it. In certain practical applications such as uncured tires, belting, shoes and a number of other products in the course of manufacture, green strength is important in assuring the integrity and cohesiveness of the assembly or of parts between building or assembly and ultimate vulcanization. Green strength manifests itself secondarily in the tack or adhesiveness imparted to various formulations employed in the manufacture of a number of rubber articles such as tires, belting, etc. Other things being equal, a higher green strength polymer will yield higher tack or adhesion and will ease the problems of handling a raw product between assembly or building and ultimate vulcanization.

Among the various additive compounds or agents which have been utilized to improve green strength of synthetic rubber elastomers are numerous nitroso compounds as set forth in U.S. Pat. Nos. 2,457,331; 2,477,015; 2,518,576; 2,526,504; 2,540,596; 2,690,780; and 3,093,614. Additionally, various dioxine compounds have been utilized such as those set forth in U.S. Pat. Nos. 2,969,341; 3,037,954; 3,160,595; and British Pat. No. 896,309. Yet another class of additives or compounds are the diesters of 5-norbonene as set forth in U.S. Pat. Nos. 3,817,883 and 3,843,613.

Although numerous compounds have been utilized as additives as by mixing, blending, or added directly to the elastomer chain, or otherwise utilized, the prior art patents are not pertinent in that they do not relate or suggest the use of a dihydrazide compound to cross-link the elastomers.

SUMMARY OF THE INVENTION

It is therefore an object of the present invention to improve the green strength of synthetic elastomers by cross-linking them with a dihydrazide compound.

It is another object of the present invention to improve the green strength of synthetic elastomers, as above, wherein the dihydrazide compound is mixed with the elastomer through any conventional method such as during polymerization or on a Banbury.

It is a further object of the present invention to improve the green strength of synthetic elastomers, as above, wherein the dihydrazide compound is caused to cross-link the elastomers upon heating.

It is an additional object of the present invention to improve the green strength of synthetic elastomers, as above, wherein the dihydrazide compound has an alkyl group containing from 2 to about 10 carbon atoms, a cycloalkyl group containing from 4 to 10 carbon atoms, an aromatic group containing from 6 to 10 carbon atoms, and combinations thereof.

It is still another object of the present invention to improve the green strength of synthetic elastomers, as above, wherein the elastomers may be polyisoprene, polybutadiene or styrenebutadiene rubber.

It is still a further object of the present invention to improve the green strength of synthetic elastomers, as above, wherein the cross-linked elastomers may be utilized in radial tire carcasses.

In general, a process for improving the green strength of synthetic elastomers comprises, mixing a synthetic elastomer with from about 0.25 to about 2.0 parts by weight per 100 parts of said elastomer of a dihydrazide compound having the formula $NH_2$—NH—CO—R—CO—NH—$NH_2$ where R is an alkyl group having from 2 to 10 carbon atoms, a cycloalkyl group having from 4 to 10 carbon atoms, an aromatic group having from 6 to 10 carbon atoms and combinations thereof, said synthetic elastomer being made from monomers selected from the class consisting of dienes having from 4 to 10 carbon atoms, comonomers of dienes having from 4 to 10 carbon atoms to form copolymers and comonomers of dienes having from 4 to 10 carbon atoms with olefin monomers having from about 2 to about 14 carbon atoms to form copolymers and cross-linking said synthetic elastomers with said dihydrazide compound by mixing at a temperature of from about 125° F to about 300° F. Similarly, a composition of a synthetic elastomer having improved green strength comprises a synthetic elastomer cross-linked with from about 0.25 to about 2.0 parts by weight per 100 parts of said elastomer of a dihydrazide compound having the formula $NH_2$—NH—CO—R—CO—NH—$NH_2$ where R is an alkyl group having from 2 to about 10 carbon atoms, a cycloalkyl group having from 4 to 10 carbon atoms, an aromatic group having from 6 to 10 carbon atoms, and combinations thereof, and said synthetic elastomer is made from monomers selected from the class consisting of dienes having from 4 to 10 carbon atoms, comonomers of dienes having from about 2 to about 14 carbon atoms to form copolymers and olefins having from 2 to about 14 carbon atoms to form copolymers.

DESCRIPTION OF THE PREFERRED EMBODIMENTS

According to the concepts of the present invention, the green strength of synthetic elastomers is improved solely through the cross-links formed by dihydrazide compounds. The amount of the dihydrazide utilized is small so that a major cross-linked network is not effected as in a vulcanized compound and so that a raw gum or a compounded elastomer is easily worked or masticated.

The synthetic or rubber elastomers of the present invention are polymers or copolymers made from monomers or monomers, generally considered by those skilled in the art, capable of forming rubber elastomers. More specifically, the monomers are selected from the group of compounds consisting of conjugated dienes having from 4 to about 10 carbon atoms, comonomers of various dienes having from 4 to 10 carbon atoms so that copolymers are formed and monomers of dienes having from 4 to 10 carbon atoms with olefins having from 2 to 14 carbon atoms. A preferred group of olefin compounds are the vinyl substituted aromatic hydrocarbons containing from 8 to 12 carbon atoms and includes styrene, alpha-methylstyrene, ortho-, para, and meta-methyl and ethyl styrene and the like. Specific examples of olefins include methene, propene, butene, pentene, hexene, heptene, octene, nonene, decene, dodecene and the like. Concerning the diene compounds, the dienes having from 4 to 6 carbon atoms are preferred.

Specific synthetic or rubber elastomers which may be utilized in the present invention include polybutadiene, both cis and trans, polyisoprene, both cis and trans, polypiperylene, copolymers or interpolymers of the dienes, for example, copolymers of isoprene and butadiene, butadiene and piperylene, and the like. Additionally, copolymers of the dienes and an olefin may be utilized and examples include copolymers of styrene and butadiene, alpha-methylstyrene and butadiene, butadiene and butene and the like. Highly preferred synthetic elastomers of the present invention include synthetic cis-1,4-polyisoprene and polybutadiene, particularly the cis isomer.

The synthetic elastomers are prepared according to conventional or common methods or processes well known to those skilled in the art. Generally, an emulsion process may be utilized or a free radical process wherein the elastomer monomer is soluble in a solvent. Of course, the elastomers may additionally be prepared utilizing an anionic polymerization with various commonly employed catalysts such as organolithium compounds.

When copolymers are prepared utilizing an olefin, the amount of the olefin may range from about 0.1 to about 99 percent by weight. That is, so long as a few diene monomers are contained in the monomeric mixture, copolymers can be formed. Generally, the weight percent of the olefin compound will usually range from 0.1 to about 55 percent with a more desirable range being from about 10 percent to 40 percent. The preferred range of the olefin compound such as styrene or alpha-methylstyrene ranges from about 15 percent to about 25 percent.

The dihydrazides utilized to cross-link the synthetic or rubber elastomer have the following formula $NH_2-NH-CO-R-CO-NH-NH_2$ where R is an alkyl group having from 2 to 10 carbon atoms, a cycloalkyl having from 4 to 10 carbon atoms, an aromatic having from 6 to 10 carbon atoms, and combinations thereof. The alkyl groups are preferred and desirably, R contains 2 to 8 carbon atoms. Specific examples of various dihydrazides include succinic dihydrazide, glutaric dihydrazide, adipic dihydrazide, pimelic dihydrazide, suberic dihydrazide, azelaic dihydrazide, sebacic dihydrazide, cyclohexyl dihydrazide and benzyl dihydrazide, and the like. Adipic and sebacic dihydrazide are highly preferred in the present invention with adipic dihydrazide giving the best results.

The amount of the dihydrazide compound utilized based upon 100 parts of elastomer or rubber ranges from about 0.25 to about 2.0 parts by weight. The preferred range is from about 0.75 to about 1.25 parts. The dihydrazide compound pound is added and usually mechanically mixed with the synthetic elastomer in any manner including common and conventional processes. Perhaps the two most conventional methods utilized are the cement phase and the addition of a compound to an elastomer upon a mill as during mastication. Briefly, the first process which is well known to those skilled in the art includes adding an additive during the latter stages of polymerization wherein usually the elastomer polymer is contained in a solvent. The solvent is then removed. The second method merely involves the addition of a desirable amount of additive to the synthetic elastomer and mixing as during mastication on a mill or during a mixing operation as in a Banbury. Regardless of method, the only requirement generally is that the dihydrazide compound be mixed with the elastomer in some manner.

It has been found that when a Banbury or a mastication type of mixing is utilized, less amounts of the dihydrazide compound are required then that when the dihydrazide compound is added to the polymerization preparation or cement phase of the polymer preparation. Thus, a preferred range utilizing the Banbury or mastication process is from about 0.75 to about 1.0 parts whereas the amount for the polymerization or cement phase is from about 1.0 to about 1.25 parts by weight per 100 parts of elastomer. When the latter type method is utilized, as known to those skilled in the art, the cement phase is converted to a "crumb", then to a solid polymer which is then mixed on a Banbury or other type of mixer.

In order for the dihydrazide compound to cross-link the elastomers, the temperature of the mixture must range from about 125° F to about 300° F with a preferred range being from about 150° F to about 275° F. Generally, due to the mixing action encountered in a Banbury or the mastication process, the mixing temperature is generally higher than that of a cement phase operation. Thus, a preferred temperature for the former is from about 225° F to about 275° F with the preferred temperature for the latter or polymer manufacture process is from about 150° F to about 225° F. Generally, the temperature should not exceed approximately 300° F in that various synthetic elastomers such as synthetic cis-1,4-polyisoprene will tend to degrade.

The elastomer polymers of the present invention which are cross-linked by the dihydrazide compounds may be compounded according to typical, common or conventional methods for processes and thus may contain various common or conventional compounding agents in various or typical amounts. Some examples of various compounding agents which may be utilized include zinc oxide, various carbon blacks, various clays, various silicas, calcium carbonate, various plasticizers, various oils, various antioxidants, various accelerators, various reinforcing or non-reinforcing fibers, various curing agents and the like. The curing agents such as sulfur or peroxides are generally utilized in a standard or conventional amount since the cross-linking effected by the dihydrazide compounds only effect a very small amount of cross-links, perhaps only 1/100 of that effected by curing agents. In other words, it is thought that the dihydrazide compounds only effect a very small amount of cross-linking so that the green strength is improved but that the processing abilities are almost unchanged.

The invention will be better understood by the following recipes, examples, and data.

The synthetic elastomers were prepared as follows:

Isoprene (18 to 21 percent) is dissolved in a suitable hydrocarbon solvent such as pentane, hexane or heptane. To this solution an aluminum alkyl such as triisobutyl aluminum and a titanium tetrachloride catalyst is added in an appropriate amount along with such materials as diphenyl ether, butyl ether or anisole ether to enhance catalyst action. Catalyst concentration ranges from 0.25 pphr to 1.0 pphr, depending on the reactivity of the isoprene. In-batch practice reaction time will be around 6 to 8 hours while in continuous reaction practice, the mixture will move through the reactors in the system so that presence with catalyst will be about 4 to 6 hours. The temperature of the reaction is about 25-30° C. In the course of this reaction, the solution will change from a watery consistency to a viscous cement, approximately 75-80 percent conversion, at which time the reaction is stopped by the addition of shortstops to the reaction system. A variety of materials may be used for shortstopping, for example, amines such as tetraethylenepentamine, triethylenetraamine, triisopropanolamine as well as other amines such as water, air, ethyl alcohol, sodium methoxide and the like. The preferred materials are tetraethylenepentamine (TEPA), triisopropanolamine (TIPA) and sodium methoxide. The preferred concentration for TEPA (Recipe "A") and sodium methoxide (Recipe "B") is 1.0 pphr while for TIPA (Recipe "C"), the concentration is 1.5 pphr.

To the shortstopped cement is added a stabilizer such as 1.0 pphr dibutylmethylphenol. Normal manufacturing process would end here with finishing following. For improved green strength, the dihydrazide may be added either with the stabilizer or subsequent to it as in Example III. As the cement is processed further to finish it from a viscous liquid to a solid rubber, it is necessary to put heat and mechanical working into the system. This energy input causes the dihydrazide to crosslink with the polymer in a fashion different from the polymerization reaction, imparting in the process higher green strength to the ultimate polymer. The polymer is finished in the normal way with steam stripping of solvent and coagulating in an aqueous system, expelling of the water and agglomerating into a solid rubber.

EXAMPLE I

Adipic dihydrazide in the amount of 0.50 parts was added to 100 parts of a cis-1,4-polyisoprene made according to Recipe "A" and mixed on a Banbury for two minutes at 225° F. The reacted or cross-linked synthetic elastomer was rolled up in the gum stock and shelfed aged for 16 to 24 hours. The raw gum was then cut into dumbbells. The cross-linked elastomer was tested with a control which was made, milled and shelf aged in an identical manner except that no dihydrazide compound was added. Additionally, a natural rubber control was also made in an identical manner except that no dihydrazide was added.

Table I sets forth the tensile strength in psi recorded at various percents of elongation after being milled with the various set forth compounds. Table I also sets forth green strength before and after a gum rubber was remilled for 5 minutes at 225° F to simulate actual working as encountered in the preparation of a tire carcass. The gum rubber did not contain any of the compounds set forth in the Table I recipe.

TABLE I

|  | NATURAL RUBBER | CONTROL | A |
|---|---|---|---|
| #1 SM Sheet | 100.0 |  |  |
| Synthetic cis-1,4-polyisoprene (Recipe "A") |  | 100.0 | 100.0 |
| Adipic Dihydrazide |  |  | 0.50 |
| Zinc Oxide | 3.0 | 3.0 | 3.0 |
| Stearic Acid | 2.0 | 2.0 | 2.0 |
| NAF Black | 25.0 | 25.0 | 25.0 |
| Pine Tar | 3.0 | 3.0 | 3.0 |
| BLE - A complex reaction product of acetone and diphenylamine | 1.0 | 1.0 | 1.0 |
| Santocure NS (N - t - Butyl - 2- Benzothiazole Sulfenamide) | 0.8 | 0.8 | 0.8 |
| Sulfur | 2.0 | 2.0 | 2.0 |
|  | 136.80 | 136.80 | 136.30 |
| TENSILE, PSI |  |  |  |
| 30/275F | 5125. | 5025. | 4950. |
| 40/275F | 5100. | 4550. | 4650. |
| 60/275F | 5000. | 4500. | 4525. |
| ELONGATION, % |  |  |  |
| 30/275F | 640. | 670. | 630. |
| 40/275F | 640. | 610. | 610. |
| 60/275F | 650. | 600. | 600. |
| 300% MODULUS, PSI |  |  |  |
| 30/275F | 1075. | 875. | 1100. |
| 40/275F | 1100. | 1050. | 1225. |
| 60/275F | 1100. | 1025. | 1150. |

|  | % Elongation | Natural Rubber | Control (PSI) Natsyn 200 | A. (PSI) .5% Adipic Dihydrazide 100 Natsyn 200 |
|---|---|---|---|---|
| Green Strength Original | 100 | 37 | 34 | 41 |
|  | 200 | 39 | 26 | 34 |
|  | 300 | 40 | 24 | 32 |
|  | 400 | 70 | 23 | 34 |

TABLE I-continued

|  |  |  |  |  |
|---|---|---|---|---|
|  | 500 | 100 | 22 | 37 |
|  | 600 | 130 | 22 | 43 |
|  | 700 | 148(650) | 23 | 51 |
|  | 800 |  | 24 | 60 |
|  | 900 |  | 24 | 70 |
|  | 1000 |  | 25 | 80 |
|  | 1100 |  | 26 | 90 |
|  | 1200 |  | 27 | 100 |
|  | Ult |  | 32 |  |
| 5 Min | 100 | 32 | 29 | 37 |
| Remill | 200 | 30 | 20 | 29 |
|  | 300 | 35 | 15 | 29 |
|  | 400 | 45 | 13 | 29 |
|  | 500 | 67 | 13 | 31 |
|  | 600 | 82 | 12 | 34 |
|  | 700 | 96 | 12 | 39 |
|  | 800 | 116 | 11 | 44 |
|  | 900 | 126(850) | 11 | 50 |
|  | 1000 |  | 11 | 51(930) |
|  | 1100 |  | 10 |  |
|  | 1200 |  | 14 |  |
|  | Ult |  | 14 |  |

EXAMPLE II

In a manner similar to that set forth in Example I, adipic dihydrazide was added to different elastomers of cis-1,4-polyisoprene made according to Recipes B and C and tested for original green strength, original green strength after remilling for 5 minutes on a Banbury at 225° F and then compounded and tested for various physical properties. The results are set forth in Table II.

TABLE II

| 10J1377 |  | A | CONTROL | CONTROL | B | C |
|---|---|---|---|---|---|---|
| #1 Sm Sheet (natural rubber) |  | 100.00 |  |  |  |  |
| Synthetic cis-1,4-polyisoprene |  |  |  |  |  |  |
| Recipe "B" |  |  | 100.00 |  | 100.00 |  |
| Recipe "C" |  |  |  | 100.00 |  | 100.0 |
| Adipic Dihydrazide |  |  |  |  | 0.50 | 0.50 |
| Zinc Oxide |  | 3.00 | 3.00 | 3.00 | 3.00 | 3.00 |
| Stearic Acid |  | 2.00 | 2.00 | 2.00 | 2.00 | 2.00 |
| HAF black |  | 25.00 | 25.00 | 25.00 | 25.00 | 25.00 |
| BLE |  | 1.00 | 1.00 | 1.00 | 1.00 | 1.00 |
| Pine Tar |  | 3.00 | 3.00 | 3.00 | 3.00 | 3.00 |
| Santocure NS |  | 0.80 | 1.00 | 1.35 | 1.00 | 1.35 |
| Sulfur |  | 2.00 | 2.00 | 2.00 | 2.00 | 2.00 |
| Cured at 300° F - Min |  |  |  |  |  |  |
| Tensile psi | 10 | 3820 | 4600 | 3860 | 4475 | 4600 |
|  | 20 | 4400 | 4075 | 4175 | 4000 | 4290 |
|  | 40 | 4100 | 3800 | 3790 | 4100 | 3920 |
| Elong % | 10 | 680 | 730 | 700 | 650 | 635 |
|  | 20 | 610 | 530 | 580 | 595 | 600 |
|  | 40 | 600 | 580 | 540 | 605 | 590 |
| Modulus | 10 | 640 | 900 | 500 | 950 | 960 |
| 300% | 20 | 1080 | 1020 | 1040 | 1000 | 1070 |
|  | 40 | 1010 | 900 | 1070 | 980 | 960 |
|  |  | NATURAL RUBBER | CONTROL | CONTROL | B | C |
| Green | 100 | 36 | 39 | 31 | 31 | 32 |
| Strength | 200 | 33 | 35 | 25 | 28 | 29 |
| Original | 300 | 35 | 33 | 20 | 26 | 28 |
|  | 400 | 43 | 33 | 19 | 25 | 30 |
|  | 500 | 54 | 35 | 18 | 27 | 34 |
|  | 600 | 70 | 39 | 18 | 29 | 40 |
|  | 700 | 87 | 47 | 17 | 33 | 49 |
|  | 800 | 93(730) | 55 | 16 | 36 | 61 |
|  | 900 |  | 65 | 15 | 41 | 75 |
|  | 1000 |  | 77 | 15 | 48 | 77(925) |
|  | 1100 |  | 89 | 15 | 53 |  |
|  | 1200 |  |  | 14 |  |  |
|  | ULT |  |  | 14 |  |  |
| 5 Min | 100 | 30 | 29 | 30 | 33 | 30 |
| Remill | 200 | 27 | 22 | 23 | 27 | 24 |
|  | 300 | 29 | 18 | 17 | 23 | 21 |
|  | 400 | 35 | 16 | 14 | 21 | 20 |
|  | 500 | 43 | 15 | 12 | 20 | 19 |
|  | 600 | 54 | 14 | 11 | 20 | 20 |
|  | 700 | 65 | 13 | 10 | 21 | 21 |
|  | 800 | 77 | 13 | 9 | 22 | 23 |
|  | 900 | 86(880) | 13 | 8 | 24 | 24 |
|  | 1000 |  | 13 | 8 | 25 | 26 |
|  | 1100 |  | 13 | 8 | 27 | 27 |
|  | 1200 |  | 12 |  | 28 | 28 |
| ULT | ULT |  | 12 |  | 39 | 34 |

As obvious from the Table, both compounds B and C show a great improvement in green strength. Additionally, the physical properties of compounds B and C were generally equivalent to or better than their respective controls. Once again, the 300 percent modulus of the adipic dihydrazide compounds B and C were greatly improved over their controls.

EXAMPLE III

In this Example, 1.0 parts of sebacic dihydrizide was added during the polymerization of the elastomer of Recipe A. The control and compound D which are identical except for the addition of the sebacic dihydrazide during the final stage of the polymerization were made into dumbbells and tested for green strength. The synthetic elastomers were then compounded according to the recipe set forth in Table III and tested.

TABLE III

|  |  | NATURAL RUBBER | CONTROL | D |
|---|---|---|---|---|
| #1 Smoked Sheet |  | 100.00 | 0.0 | 0.0 |
| Cis-1,4-polyisoprene (Recipe "A") |  | 0.0 | 100.00 | 0.0 |
| Sebacic Dihydrazide 1 part |  | 0.0 | 0.0 | 100.00 |
| Zinc Oxide |  | 3.00 | 3.00 | 3.00 |
| Stearic Acid |  | 2.00 | 2.00 | 2.00 |
| HAF BLACK |  | 25.00 | 25.00 | 25.00 |
| BLE |  | 1.00 | 1.00 | 1.00 |
| PINE TAR |  | 3.00 | 3.00 | 3.00 |
| Santocure NS |  | 0.80 | 0.80 | 0.80 |
| Sulfur |  | 2.00 | 2.00 | 2.00 |
|  |  | 136.80 | 136.80 | 136.80 |
| TENSILE,PSI - SCOTT |  | ,DIE C IN./MIN. |  |  |
| 30/275F |  | 5275. | 4700. | 4725. |
| 40/275F |  | 4725. | 4850. | 4950. |
| 60/275F |  | 4850. | 4525. | 4400. |
| Elongation, % |  |  |  |  |
| 30/275F |  | 650. | 650. | 660. |
| 40/275F |  | 590. | 650. | 650. |
| 60/275F |  | 610. | 600. | 600. |
| 300% MODULUS, PSI |  |  |  |  |
| 30/275F |  | 1000. | 800. | 925. |
| 40/275F |  | 1200. | 900. | 925. |
| 60/275F |  | 1200. | 925. | 950. |
| Green | 100 | 43 | 34 | 37 |
| Strength | 200 | 39 | 29 | 29 |
| Original | 300 | 41 | 23 | 26 |
|  | 400 | 50 | 21 | 25 |
|  | 500 | 64 | 20 | 24 |
|  | 600 | 86 | 20 | 25 |
|  | 700 | 112 | 20 | 26 |
|  | 800 | 116(720) | 19 | 28 |
|  | 900 |  | 19 | 30 |
|  | 1000 |  | 19 | 33 |
|  | 1100 |  | 18 | 36 |
|  | 1200 |  | 18 | 39 |
|  | ULT |  | 24 | 49 |
| 5 Min | 100 | 35 | 26 | 28 |
| Mill | 200 | 30 | 20 | 22 |
|  | 300 | 29 | 16 | 18 |
|  | 400 | 33 | 14 | 16 |
| 160° F | 500 | 40 | 13 | 15 |
|  | 600 | 49 | 12 | 14 |
|  | 700 | 59 | 11 | 14 |
|  | 800 | 72 | 11 | 14 |
|  | 900 | 77(840) | 10 | 14 |
|  | 1000 |  | 10 | 14 |
|  | 1100 |  | 9 | 14 |
|  | 1200 |  | 9 | 14 |
|  | ULT |  | 8 | 18 |

Once again, a dihydrizide compound within the scope of the present invention gave improved green strength properties, both original and after milling for 5 minutes. However, it is noted that green strength improvement is slightly greater using adipic dihydrizide than it is using sebacic dihydrizide. Concerning the physical properties upon cure, compound D gave similar properties to the control with the exception of the 300 percent modulus which was once again somewhat higher.

As well known to those skilled in the art, synthetic elastomers generally are mixed with either natural or synthetic cis-1,4-polyisoprene when the end product is a tire or a related item. Thus, the improved green strength elastomer of the present invention can be blended with various and conventional amounts of either natural or synthetic cis-1,4-polyisoprene at any stage of the process such as at compounding. Generally, truck tires require larger amounts of natural or synthetic cis-1,4-polyisoprene than do passenger car tires.

From the foregoing examples and tables, it can be seen that the objects of the present invention are met in that various dihydrizide compounds improved both raw green strength and green strength of gums after milling or remilling. As apparent to those skilled in the art, many modifications of the invention can be made without departing from the spirit of the invention disclosed and described herein, the scope of the invention being measured by the scope of the attached claims.

What is claimed is:

1. A process for improving the green strength of synthetic elastomers, comprising:
    mixing a synthetic elastomer with a small amount of from about 0.25 to about 2.0 parts by weight per 100 parts of said elastomer of a dihydrazide compound having the formula $NH_2—NH—CO—R—CO—NH—NH_2$ where R is an alkyl group having from 2 to 10 carbon atoms to form a mixture,
    said synthetic elastomer made from the solution polymerization of monomers selected from the class consisting of dienes having from 4 to 10 carbon atoms, comonomers of dienes having from 4 to 10 carbon atoms to form copolymers, and comonomers of dienes having from 4 to 10 carbon atoms with olefin monomers having from 2 to about 14 carbon atoms to form copolymers, producing an improved green strength elastomer by partially cross-linking said elastomer to effect less than a vulcanized elastomer, and heating said elastomer dihydrazide mixture at a temperature of from about 125° F to about 300° F.

2. A process according to claim 1, wherein said elastomer made from said diene monomers have from 4 to 6 carbon atoms and wherein said olefin monomers have from 8 to 12 carbon atoms.

3. A process according to claim 2, wherein said olefin is a vinyl substituted aromatic hydrocarbon selected from the group consisting of styrene, alpha-methylstyrene, methylstyrene and ethylstyrene, said amount of said styrene compound in said copolymer ranging from about 0.1 to about 55 percent by weight.

4. A process according to claim 3, wherein said olefin compound is selected from the group consisting of sytrene and alpha-methylstyrene, said styrene compound in said copolymer ranging from about 10 to about 40 percent by weight.

5. A process according to claim 4, wherein said R is an alkyl group containing from 2 to 8 carbon atoms.

6. A process according to claim 5, wherein the amount of said dihydrizide compound ranges from about 0.75 to about 1.25 parts.

7. A process according to claim 6, wherein said temperature ranges from about 150° F to about 275° F.

8. A process according to claim 7, wherein said synthetic elastomers are selected from the group consisting of butadiene, polyisoprene, polypiperylene, a copolymer of isoprene and butadiene, a copolymer of butadiene and piperylene, a copolymer of butadiene and styrene, a copolymer of alpha-methylstyrene and butadiene and a copolymer of butadiene and butene.

9. A process according to claim 8, wherein said elastomer is selected from the group consisting of synthetic cis-1,4-polyisoprene and polybutadiene and said dihydrizide compound is selected from the group consisting of adipic dihydrizide and sebacic dihydrizide.

10. A process according to claim 7, wherein said dihydrizide compound is added to said elastomer on a mechanical mixer.

11. A process according to claim 10, wherein said synthetic elastomer is selected from the group consisting of synthetic cis-1,4-polyisoprene and polybutadiene and said dihydrizide compound is selected from the group consisting of adipic dihydrizide and sebacic dihydrizide.

12. A process according to claim 11, wherein said amount of dihydrizide compound ranges from about 0.75 to about 1.0 parts and said temperature ranges from about 225° F to about 275° F.

13. A process according to claim 8, wherein said dihydrazide is selected from the class consisting of succinic dihydrazide, glutaric dihydrazide, adipic dihydrazide, pimelic dihydrazide, suberic dihydrazide, azelaic dihydrazide, sebacic dihydrazide, and combinations thereof.

* * * * *